United States Patent
Mason et al.

(10) Patent No.: US 10,083,363 B2
(45) Date of Patent: Sep. 25, 2018

(54) SYSTEM AND METHOD FOR CUSTOMIZING CONTENT FOR A USER

(71) Applicant: NBCUniversal Media, LLC, New York, NY (US)

(72) Inventors: Thomas Bause Mason, Englewood Cliffs, NJ (US); Michael Pleckaitis, Englewood Cliffs, NJ (US)

(73) Assignee: NBCUNIVERSAL MEDIA, LLC, New York, NY (US)

( * ) Notice: Subject to any disclaimer, the term of this patent is extended or adjusted under 35 U.S.C. 154(b) by 165 days.

(21) Appl. No.: 14/721,964

(22) Filed: May 26, 2015

(65) Prior Publication Data

US 2016/0350609 A1    Dec. 1, 2016

(51) Int. Cl.
  *G06T 15/00* (2011.01)
  *G06K 9/00* (2006.01)
  *G06T 19/00* (2011.01)
  *G06T 15/20* (2011.01)

(52) U.S. Cl.
  CPC .......... *G06K 9/00892* (2013.01); *G06T 15/20* (2013.01); *G06T 19/003* (2013.01); *G06T 19/006* (2013.01); *G06T 2200/04* (2013.01); *G06T 2219/016* (2013.01)

(58) Field of Classification Search
  None
  See application file for complete search history.

(56) References Cited

U.S. PATENT DOCUMENTS

| | | | |
|---|---|---|---|
| 2012/0036004 A1* | 2/2012 | Pradeep | A61B 5/04842 705/14.41 |
| 2012/0263154 A1* | 10/2012 | Blanchflower | G06F 17/30247 370/338 |
| 2013/0040271 A1* | 2/2013 | Rytky | G09B 19/0038 434/247 |
| 2014/0316192 A1* | 10/2014 | de Zambotti | A61M 21/02 600/28 |
| 2015/0306340 A1* | 10/2015 | Giap | A61B 5/05 600/301 |
| 2017/0304581 A1* | 10/2017 | Kuboi | A61M 21/00 |

\* cited by examiner

*Primary Examiner* — Andrew G Yang
(74) *Attorney, Agent, or Firm* — Lee, Hong, Degerman, Kang & Waimey PC (57) ABSTRACT

A method for customizing content presented to a user, including presenting content to the user; receiving condition information related to a condition of the user; modifying the content being presented to the user to facilitate changing of the condition toward a target condition; and presenting the modified content to the user. An embodiment of the method may also include receiving updated condition information of an updated condition of the user after presenting the modified content to the user, where the updated condition is not within a threshold range of the target condition; and modifying the content again to facilitate changing the updated condition to be within the threshold range of the target condition.

24 Claims, 7 Drawing Sheets

SYSTEM AND METHOD FOR CUSTOMIZING CONTENT FOR A USER

Virtual Reality (VR) content provides an enhanced viewing and interactive experience for a user by conveying the feeling of being immersed within an environment. Most VR systems enhance the experience by providing the user with the ability to change the user's viewpoint within the content or with respect to various elements of the content, and the environment, characters, and objects within the content may be presented to have a three-dimensional (3D) effect.

However, while allowing the user to vary factors such as viewing angle, relative position, and the like, the actual content available to a user within a virtual reality presentation is traditionally static and not adjustable based on a particular user or a current or previous condition of the user during the presentation. Since VR content provides such an enhanced viewing experience by immersing the user into an environment, a user's experience and enjoyment may be directly affected by certain aspects or characteristics of the VR content.

Users may actually have negative experiences and not enjoy the VR content if certain aspects of the content cannot be adjusted or customized to the user's preferences or user's current condition during the presentation. In addition, as the technology for VR content rapidly improves, the user's sense of realism is drastically increased, thereby also heightening the body's natural reactions and instincts to what is perceived as a real experience. In some cases, presenting VR content without consideration of a user's condition may be very dangerous for users who have certain health risks, such as a heart condition, hypertension, high risk of stroke, and the like. In other cases, a user may simply not enjoy the VR content sufficiently if certain adjustments are not made which take into consideration the user's preferences or current condition.

Therefore, the ability to monitor a user's experience and adjust or customize VR content while the user is being presented with the content may be advantageous. Thus, there is a great need for a solution to effectively improve a user's VR experience by adjusting or customizing VR content based on preferences or a current condition of the user during the presentation.

SUMMARY

Embodiments of the present disclosure include a system and method for modifying VR content during presentation of the VR content to a user based on monitoring information of a current condition or a condition history of the user during presentation of the VR content. In some embodiments, the modification may be performed so that the user has a more enjoyable or comfortable experience during the VR content presentation. In other embodiments, the modification may be performed so that the user experiences the VR content in a specific intended manner or with certain intended reactions to the VR content. In yet other embodiments, the modification may be performed to improve the experience for the user by taking into consideration the user's preferences or current condition.

In some embodiments, the current condition of the user may be monitored by measuring physical aspects of the user including biometric information. In other embodiments, a predetermined desired value or range of desired values may be used to compare a particular value associated with the current state of the user in order to obtain a desired result to affect the user's experience.

An embodiment of a method of the present disclosure includes presenting content to the user, receiving status information related to a status of the user and comparing the status information to a desired status value, modifying the content to change the status of the user toward a desired status value, and presenting the modified content to the user. In some embodiments, the modification of the content may be based on analysis of various data, including information related to previous modifications, previous user conditions, previous user status changes, similar compiled information related to other users, various data trends, and the like.

An embodiment of an apparatus of the present disclosure includes a memory configured to store information, a transceiver configured to transmit and receive information, and a controller configured to cause content to be presented to the user, receive, via the transceiver, status information related to a status of the user, compare the status information to a desired status value, modify the content to change the status of the user toward a desired status value, and cause the modified content to be presented to the user.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for customizing VR content for a user based on a current condition or preference of the user during presentation of the VR content.

Figure 1:
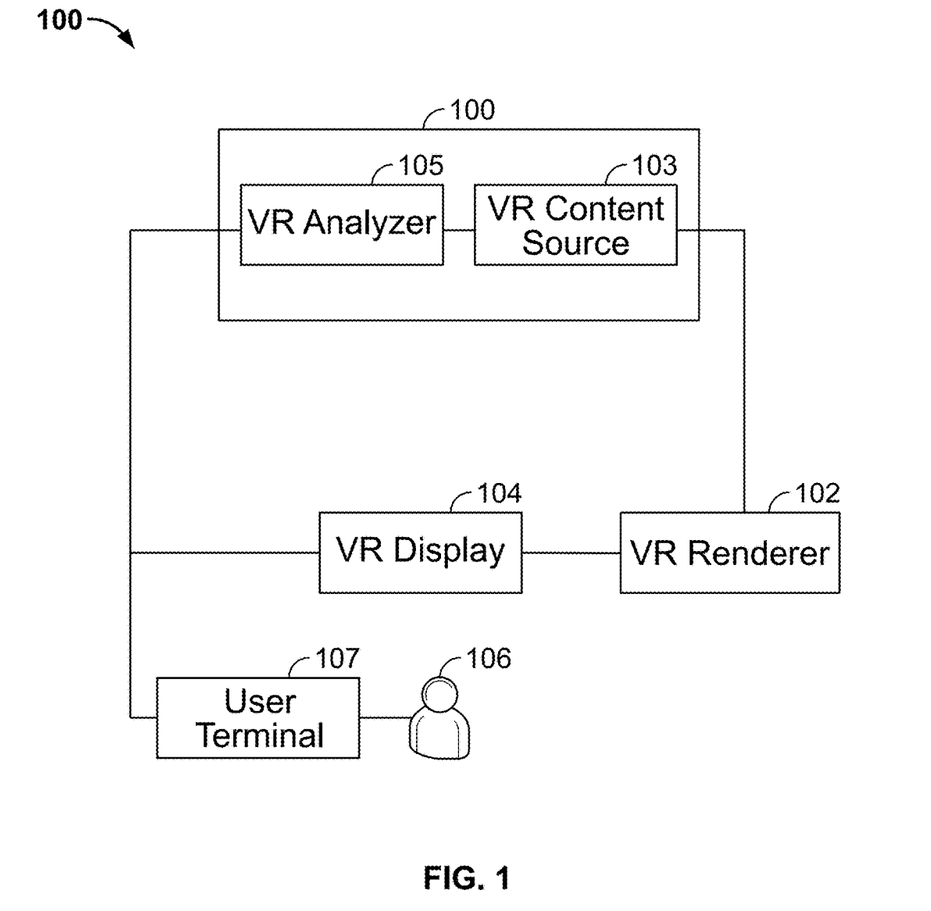
FIG. 1 is an illustration of a system for customizing VR content in accordance with an embodiment of the present disclosure.

Referring now to FIG. 1, an embodiment of a system 100 for customizing content for a user is depicted. The system 100 includes a VR content source 101 which provides content to be rendered by VR renderer 102. The VR renderer 102 may implement VR content rendering systems and techniques known to those of ordinary skill in the art. Rendering the VR content by VR renderer 102 may include generation of real-time single or multi-view visualization and single, multi-channel, or object based audio immersion of virtual environments. The video content generated may include composite video recorded and intended for VR content rendering, or may include animated video graphics content generated by a rendering engine, such as in video gaming. The rendered VR content may include content information for a full immersive virtual reality experience, including content generated for rotational 360 degree angles of view, multi-channel or object-based audio, dynamic texturing and lighting, as well as interactive content based on the user's movements or actions.

The VR renderer 102 may be configured to output the rendered VR content to a VR display 104. The VR display 104 may include various types of displays and modules known in the art for implementation of VR systems. For example, the VR display 104 may include a head mounted display, among other known configurations, to be worn on the head of user 106, providing a display a monocular or binocular display optic. The head mounted display may include speakers or headphones to provide surround sound audio to the user 106 corresponding to the visual VR content. Another embodiment may include one or more traditional displays, such as a television, arranged such that the user is provided with an immersive visualization experience. In other embodiments, the VR display 104 may include a multi-view, holographic, or other VR-type enabled display configured to provide an immersive content presentation configuration to the user. It will be understood by those of ordinary skill in the art that the VR display 104 may include and incorporate various other VR configurations and implementations known and practiced in the art, and the embodiments discussed herein are not to be limiting.

In some embodiments, the VR display 104 may include sensors to track movements, actions, reactions, or conditions of a user. For example, in one embodiment, a head mounted display may include eye tracking sensors to detect a point of gaze or motion of the user's eye relative to the user's head direction. In some embodiments, the VR display 104 may include a VR display booth, theater, home entertainment system, or other environment including displays for viewing by the user 106 which includes sensors to track the entire user's body and movement. In yet other embodiments, the VR display 104 may include cameras and motion detectors to capture and analyze various aspects of the user 106 during presentation of the VR content and the user's interactions. For example, the KINECT system developed by MICROSOFT may be implemented in conjunction with a display system in order to capture and analyze various movements, actions, reactions, or conditions of the user 106.

The VR content source 101 of system 100 may include a VR content database 103 configured to store and provide the VR content to be presented to the user. The VR content source 101 may also include a VR analyzer 105 configured to receive information related to detected information of the user 106 during presentation of the VR content by VR display 104. The information of the user 106 may be received from the VR display 104, which includes sensors configured to detect information of the user 106, including movements, actions, reactions, or various conditions of the user, such as eye movement. In some embodiments, the VR analyzer 105 may be implemented as a stand-alone system, or may be implemented to be integrated with other systems, and may also be implemented in various positions within the content distribution framework. For example, the VR analyzer 105 may be integrated as a local component, or within another component, of an in-home entertainment system. In other embodiments, the VR analyzer 105 may be located in a content distribution facility or a separate remote location independent from a VR content distribution system, including embodiments which include implementations of cloud computing functionality.

In some embodiments, the VR analyzer 105 may be configured to receive the user information from a user terminal 107 associated with the user 106, or also from the VR display 104 which includes sensors configured to detect user information. User terminals 107 may include one or more personal devices such as smartphones, smart watches, head mounted terminals, heart rate monitors, activity trackers, body temperature thermometers, eye movement trackers, EEG measuring devices, wearable devices, and the like. It is considered that in some embodiments the VR display 104 includes capabilities to detect and transmit all user condition information similar to the user terminal 107 as discussed herein.

In some embodiments, the user may be requested to enter in the user information, and in other embodiments, the VR analyzer 105 may receive the user information already stored in a terminal of the user, such as a smartphone or personal computing device. In such configurations, the user information may be retrieved from third party databases, such as social networking databases, smartphone app databases, user profile information from media application databases, and the like. The VR analyzer 105 may be configured to receive user information from the user terminal via wired or wireless connections. Thus the VR analyzer 105 may include wired and wireless interface communication interfaces known in the art, such as Bluetooth, WiFi, and the like.

The VR analyzer 105 is configured to receive user information from user terminal 107 and process user information to obtain user condition information while the user is experiencing the VR content. Using the user condition information, the VR analyzer 105 may generate VR adjustment data used by the VR content source 101 to adjust the VR content being presented to the user. A memory may be included in the VR analyzer 105 or VR content source 101 or another component of the system 100 which is configured to store information used in processing the user information. The stored information may include various factors for determining the VR adjustment data using the user information, such as user preference levels, user profile information, desired user condition values, user history information, compiled user information from other users, and the like.

For example, the VR content being presented to the user 106 via the VR display 104 may include a scene in which the user is on a ledge of a tall building. While experiencing the VR content, the user terminal 107 may detect various biometric information of the user. As the virtual experience of being on a ledge of a tall building is likely stressful for the user, the detected biometric information may include increased high heart rate, increased breathing rate, increased skin or body temperature, certain EEG measurement characteristics, and the like. In other embodiments, cameras configured to capture the appearance of the user or a gaze of the user may capture image information of the user's gestures, motions, or facial expressions which indicate a fear level in the user, such as a fearful facial expression, body language, trembling, and the like.

The detected biometric information may be received by the VR analyzer 105 via a wireless connection. The VR analyzer 105 may process the detected biometric information using comparison data stored in a memory. The comparison data may include a user preference level input previously by the user. For example, prior to presentation of the VR content, the user may be asked to enter a comfort level with various factors, such as heights. Based on the user's response, the comparison data may be stored in the memory. The VR analyzer 105 may also be configured to analyze detected information by considering stored historical data of the user, or of other users. In such configurations, the stored historical data may be analyzed and compared or matched with a generalized emotional factor previously dynamically annotated or associated with the content.

In other embodiments, the stored comparison data may include desired condition values determined and stored in the system 100. The desired condition values may include one or more ranges of various biometric information which indicate a user condition in order to ensure that the user has a particular desired experience with the VR content. The desired condition values may be modified based on information of a particular user, such as age, sex, fitness level, height, weight, fitness history, fitness level, and the like.

For example, the system 100 may utilize comparison data stored in the memory of a desired heart rate range, a desired body temperature range, a desired skin temperature range, and the like, wherein these desired ranges are determined as corresponding to a user who is experiencing the VR content at a comfortable level. The detected biometric information received from user terminal 107 may be processed or formatted to correspond to the various desired range values. If the current user biometric information indicates that the user is not comfortable while experiencing the VR content, the VR analyzer 105 may output an instruction or other information discussed further below, to modify the VR content such that the user will feel more comfortable. As a result, the VR content source 101 may output modified VR content to the renderer according to the current user condition and desired user condition effect.

For example, comparison data stored in the memory may indicate that a user experiencing the VR content in a comfortable state will have a heart beat value in the range of 60 to 100 beats per minute. When the user biometric information is received from the user terminal 105, the current user heart rate may correspond to 120 beats per minute. The VR analyzer 105 may be configured to process the user biometric information using the stored desired value range and cause the VR content to be altered or modified to reduce the user's heart rate from 120 beats per minute to a value within the stored desired range. The VR analyzer 105 may also determine a time period in which the change to the desired value range should take place, based on upcoming events within the content, the user biometric information, the user profile information including user health and age, and the like. The VR analyzer 105 may also alternatively generate modified VR content according to the instruction and output the modified VR content to the renderer.

In another example, if the VR content is intended to be exciting or thrilling for the user, and the user biometric information indicates that the user's current heart rate is 70 beats per minute, the VR analyzer may output an instruction that the VR content should be altered or modified to increase the user's heart rate from 70 beats per minute to 125 beats per minute, or another desired value predetermined and associated with the VR content.

The VR analyzer may output modification instructions or other information to cause the VR content source 101 to modify, alter, or replace the VR content in order to achieve the desired result in the user currently experiencing the VR content. For example, where the VR analyzer 105 determines that the user's comfort level is to be increased (which may correspond to decreasing the user's heart rate), the VR content source 101 may modify a particular aspect of the VR content or replace portions of the VR content such that the modified VR content results in the user being more comfortable. Referring back to the example wherein the user is on a ledge of a building within the VR content, the VR content may be altered such that the user is standing on a ledge of a lower floor of the building or a ledge very close to the ground instead of on a high ledge of the building. In another example, where the VR analyzer 105 determines that a user's fear level should be increased to improve user engagement, the VR content may be modified to increase fear inducing aspects, such as increasing the number of zombies chasing after the user from 10 to 100, and the like.

In other embodiments, the VR content source 101 may replace or remove entire scenes or segments of the VR content in order to achieve the desired result in the user's condition. For example, if a user's heart rate is detected to be extremely high while experiencing a war zone in the VR content, entire firefights or a number of enemy confrontations may be removed to allow the user to relax and maintain a comfortable and safe heart rate throughout the VR experience. In another example, a VR scene wherein the user is fleeing from a swarm of bees may be replaced with a VR scene in which the user is fleeing from a hoard of zombies if the user condition information, including biometric information, gesture information, facial recognition information, and the like, indicates that the user is becoming bored or is not fully engaged with the content. Such modifications may be performed by considering the context of content during analysis of the user information. Therefore, if the current portion of content is intended to be passively observed by the user without a feeling of engagement or interaction, the discussed modifications may be withheld as the context of the content may dictate that the user's status should be at a passive or disengaged level. Various aspects of the newly included scene may also be altered dynamically to achieve the desired user condition result, such as the effectiveness or type of weapons carried by the enemies in the war zone example, or the speed at which the hoard of zombies is pursing the user.

The new aspects or scenes of VR content may be predetermined content which was created with the intention of replacing the original VR content in particular circumstances. In other embodiments, the new aspects or scenes of VR content may be generated dynamically in response to detecting the user condition and the instructions generated by the VR analyzer 105. These aspects will be discussed further below.

The modified VR content may be provided to the renderer 102 for rendering and displayed to the user via VR display 104. The various user condition information may be continually monitored and detected, and information regarding the user condition after the user experiences the modified VR content may be provided again to the VR analyzer 105. The VR analyzer 105 may retain history information related to the modifications made to the VR content and the resulting change in the user condition. If necessary, the VR analyzer 105 may provide instructions to modify the VR content again if the previous content modification did not result in enough of a change in the user condition to achieve the desired user condition, or if it did not have the intended effect.

Figure 2A:
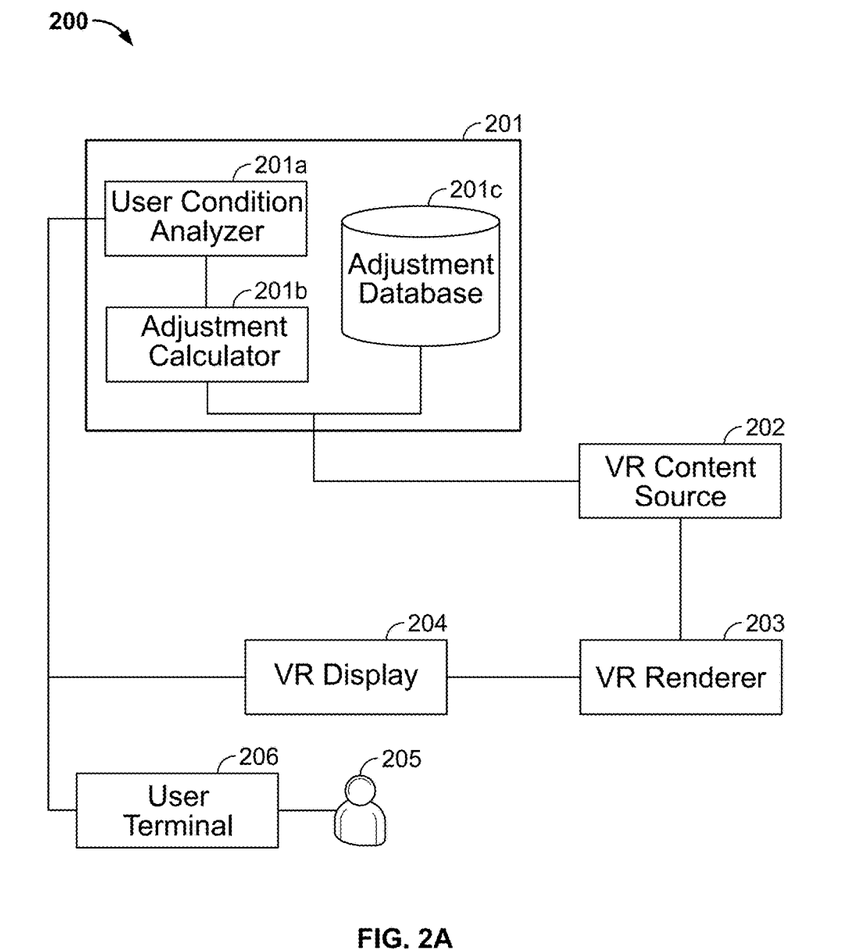
FIG. 2A is an illustration of a system for customizing VR content in accordance with another embodiment of the present disclosure.

Referring now to FIG. 2A, another embodiment of the system 200 is shown. The system 200 may include a renderer 203 and VR display 204 as discussed with respect to the embodiment of FIG. 1. The system 200 may also include a VR content adjuster 201 and VR content source 202. The VR content adjuster 201 may include a user condition analyzer 201a, an adjustment calculator 201b, and an adjustment database 201c. The user condition analyzer 201a may be configured to receive the detected user information from the VR display 204 or the user terminal 206 as previously discussed with respect to FIG. 1. The detected user information may include biometric information of the user detected by the VR display 204 or the user terminal 206, including heart rate, body temperature, skin temperature, user facial expressions, body gestures, and the like.

The user condition analyzer 201a may process the detected user information to determine a current condition of the user. The user condition analyzer 201a may be configured to categorize various data of the user information received, and may determine various corresponding metadata to match with the user condition information. For example, the user condition analyzer 201a may associate information of a user's heart rate with various metadata factors related to levels of "fear", "excitement", "emotion", and the like. As another example, the user condition analyzer 201a may associate various emotion-related metadata factors such as "happy", "sad", "angry", "scared", and the like with various EEG-based pattern information received in the user information, as known and used in the current art.

Accordingly, the user condition analyzer 201a may provide a snapshot of the current user condition based on various levels of metadata, such as a scaled number system for each condition factor. For example, each emotion or aspect of user condition may be represented by a number from 0 to 10 by the user condition analyzer 201a. Thus, a metadata factor for "fear" may be indicated by a value of "8", a metadata factor for "excitement" may be indicated by a value of "5", while a metadata factor for "happy" may be indicated by a value of "1", and so on. The present disclosure is not limited to these configurations, as other embodiments may include a user condition analyzer 201a configured to output the user condition information in various data formats, including other numerical values, metadata tags, text, raw detected data, and the like.

Further, the user condition values may be determined on a dynamic scale based on various factors and historical information of the user. The system may include dynamic analysis which considers changes over time, including condition history of the user or various usage history of the user, such that a same or similar value is indicated at different levels based on the analysis.

For example, if it is determined that a user has become healthier due to an increase in exercise over a particular period of time, a heart rate level which was previously associated with a fear factor level of "8" may be associated with a level of "6." Or in another example, if it is determined that a user has previously viewed or experienced the same VR content multiple times, a heart rate level which was previously associated with a fear factor level of "7" may be associated with a level of "9," to indicate that the user is experiencing a heightened emotion level despite knowing the content in advance. Accordingly, the system may include learning aspects which compile historical information of the user, in addition to statistics and data compiled from other users, in order to determine as well as predict certain values or outcomes for use within the VR customization system.

The adjustment calculator 201b may receive the provided user condition information from the user condition analyzer 201a and provide adjustments or modifications to be made to the VR content being presented to the user. The VR adjustment calculator 201b may use VR adjustment database 201c which is configured to store information used in determining modifications to VR content, as well as storing historical data related to modifications to VR content or to the particular current user to enable dynamic determinations based on analysis of the historical data. The VR adjustment database 201c may store desired user condition information associated with the VR content being displayed, as well as data trends, dynamic analysis, predictive data, and the like related to user condition information. Thus, the creator or provider of the VR content may also provide desired user condition profiles which include information on the desired user conditions for optimal enjoyment or to accurately experience the VR content as intended by the content creator or generator.

In some embodiments, the VR content adjuster 201 may receive the desired user condition profiles from an external source, such as a content broadcast or other provider, via a network connection. In such an embodiment, the desired user condition information may be provided dynamically in real-time along with, or separately from, the distribution of the VR content. In other embodiments, the user condition information may be received from third party sources, including adjustment databases populated and maintained by third parties in its own VR content customization system. In such configurations, the user condition information may be exchanged with such third parties, thereby greatly increasing historical user information to improve historical data analysis and the various determinations based on such analysis as discussed herein.

The VR adjustment database 201c may also store information of the particular user, such as demographic information, preferences, health history or concerns, and the like, which may be considered in modifying the VR content for the user. The user information may also include data regarding previous VR presentations to the particular user, particular VR content modifications made in previous VR presentations to the user, and the effectiveness of previous VR content modifications on the condition of the particular user. The stored information in the VR adjustment database 201c may provide a basis for dynamic content modification decisions, where modifications to the VR content are selected to cause a particular intended user condition based on its known or estimated effectiveness on the particular user.

For example, the user information stored in the VR adjustment database 201c may indicate that the user is particularly scared of clowns as compared to zombies. This information may be based on preference information specifically provided by the user, or may be based on historical user data wherein previous modifications involving clowns to VR content resulted in changes to the user condition information, such as a significant increase in the "fear" metadata value. Thus, this information may be used to select modifications to the VR content where the user is being chased by clowns instead of zombies, or vice versa, in order to increase or decrease the fear level from the detected user condition.

The VR adjustment database 201c may also include general modification information associated with specific metadata values that are generated based on data across all users historically, or that are predetermined and stored in the system.

The VR adjustment calculator 201b may use input information including the current user condition information from the user condition analyzer 201a, desired user condition information obtained or dynamic condition analysis from the VR adjustment database 201c or from an external source, and modification information from the VR adjustment database 201c to generate adjustment information related to modifications to be made to the VR content. In some embodiments, the generated adjustment information may include specific identifiers for particular VR aspects or scenes to be modified. In other embodiments, the generated information may include metadata values which indicate how much each particular metadata factor should be increased or decreased. For example, the VR adjustment calculator 201b may generate metadata information including a value of "−4" for a "fear" metadata factor, "+3" for a "relaxed" metadata factor, "+6" for a "safe" metadata factor, "−2" for an "excited" metadata factor, and the like. The various metadata values may provide an indication of how much each metadata factor should be adjusted in order to reach, or move closer to, a desired user condition for the current VR content, or to set up the user's condition for an upcoming portion of the VR content.

In some embodiments, the generated adjustment information may be provided to a third party VR content source (not depicted) to be used in generating dynamically modified VR content based on the generated adjustment information. For example, the adjustment information may be provided to a source of video game information, wherein particular aspects or scenes of the user within the video game may be modified based on the condition of the user and the generated adjustment information. In these embodiments, third party content providers may provide a customized VR experience for the user to ensure a desired condition and effect on the user, either for the entire VR experience or for certain portions of the content.

In other embodiments, the generated adjustment information may be provided to the VR content source 202 to modify the VR content by replacing or altering portions of the VR content accordingly. The VR content source 202 may be configured to dynamically generate VR content from existing VR information. As previously discussed, in some embodiments the VR content source 202 may modify or replace portions of the VR content based on VR adjustment information using pre-generated VR information intended to be used for modification of the VR content. This pre-generated VR information may thus be provided and stored in a memory to be associated with various metadata factors and metadata adjustment values.

For example, a VR scene involving clowns chasing the user may be pre-generated and stored in a memory and associated with a metadata adjustment value including "Fear: +5", and the like. This pre-generated scene may be provided specifically to replace another scene in the VR content when the generated adjustment information indicates that it should be displayed to the user. In some embodiments, particular portions within a scene may be pre-generated, provided, and stored, such as VR content of a gun held by an attacker which can be included in the VR content instead of a knife held by the attacker, and associated with a metadata adjustment value including "Danger: +7," and the like. In other embodiments, various other aspects of a scene may be similarly pre-generated, provided and stored, such as environments, weather, time of day, lighting, and the like.

Figure 2B:
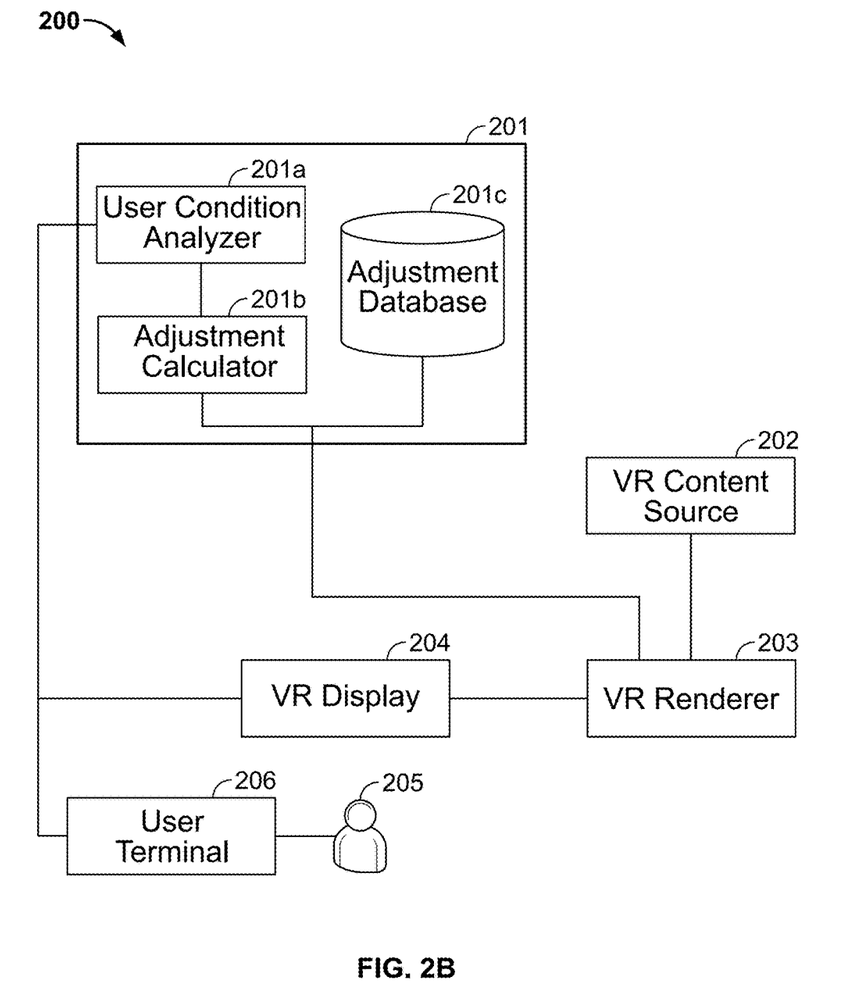
FIG. 2B is an illustration of a system for customizing VR content in accordance with another embodiment of the present disclosure.

In an alternative embodiment as shown in FIG. 2B, the VR adjustment calculator 201b may use input information including the current user condition information from the user condition analyzer 201a, desired user condition information or dynamic condition analysis obtained from the VR adjustment database 201c or from an external source to generate adjustment metadata for the VR Renderer 203 to modify the VR content. The generated adjustment metadata may be in various forms configured to provide modification instructions to the VR Renderer 203. In one embodiment, the adjustment metadata may be output as XML data to replace particular XML data included in the original VR content. In such configurations, the adjustment metadata may be provided to the VR Renderer 203 with timestamp or other information to identify the particular portion of the original VR content to be replaced or modified.

In other embodiments not depicted, the adjustment metadata may be output as metadata with descriptive information of the type of XML data to replace the original VR content, along with the identifying information. In such embodiments, the VR Renderer 203 may be configured to process the adjustment information and retrieve, generate, or obtain from another source, such as the VR Content Source 202, VR information to replace a particular identified portion of the original VR content which matches certain metadata of the adjustment information generated by the Adjustment Calculator 201b.

For example, the Adjustment Calculator 201b may generate XML data which places a particular light source at a certain set of coordinates corresponding to dramatic lighting, to replace XML data in the original VR content where the particular light source is placed at another set of coordinates. This modification may be based on an analyzed user condition which determines that the VR scene should be made more dramatic in order to increase an excitement level in the user. The generated XML data may be provided along with a timestamp, data line number, or other identifying information of the original VR content XML to be replaced, and the XML may be processed by the VR Renderer 203 which renders the VR content using the newly provided XML data. As a result, the VR Display 204 may present to the user 205 the VR content having the particular light source positioned at the dramatic lighting position, thereby changing a mood or emotion in the viewer.

In another example, the adjustment information generated by the Adjustment Calculator 201b may include identifying information of the original VR content to replace or modify, along with metadata having instructions to dictate the type of replacement content to be included. For example, the generated adjustment information may provide an instruction to replace a portion of the VR content with replacement content having a fear increment of "+3". Based on the adjustment information, the VR Renderer 203 may be configured to alter the original VR content, or retrieve replacement content having a fear increment of "+3" over the original content from the VR Content Source 202, or other content provider, such as an external content server. Using the retrieved replacement content, the VR Renderer 203 may render the VR content including the replacement content for the VR Display 204 to present to the user 205.

In other embodiments, the VR content source 202 may be configured to dynamically generate VR content with customized information for the above discussed aspects based on the adjustment information from the VR adjustment calculator 201b. The following disclosure will discuss embodiments of the VR content source 202 which provide dynamically generated VR content from non-VR content.

Figure 3:
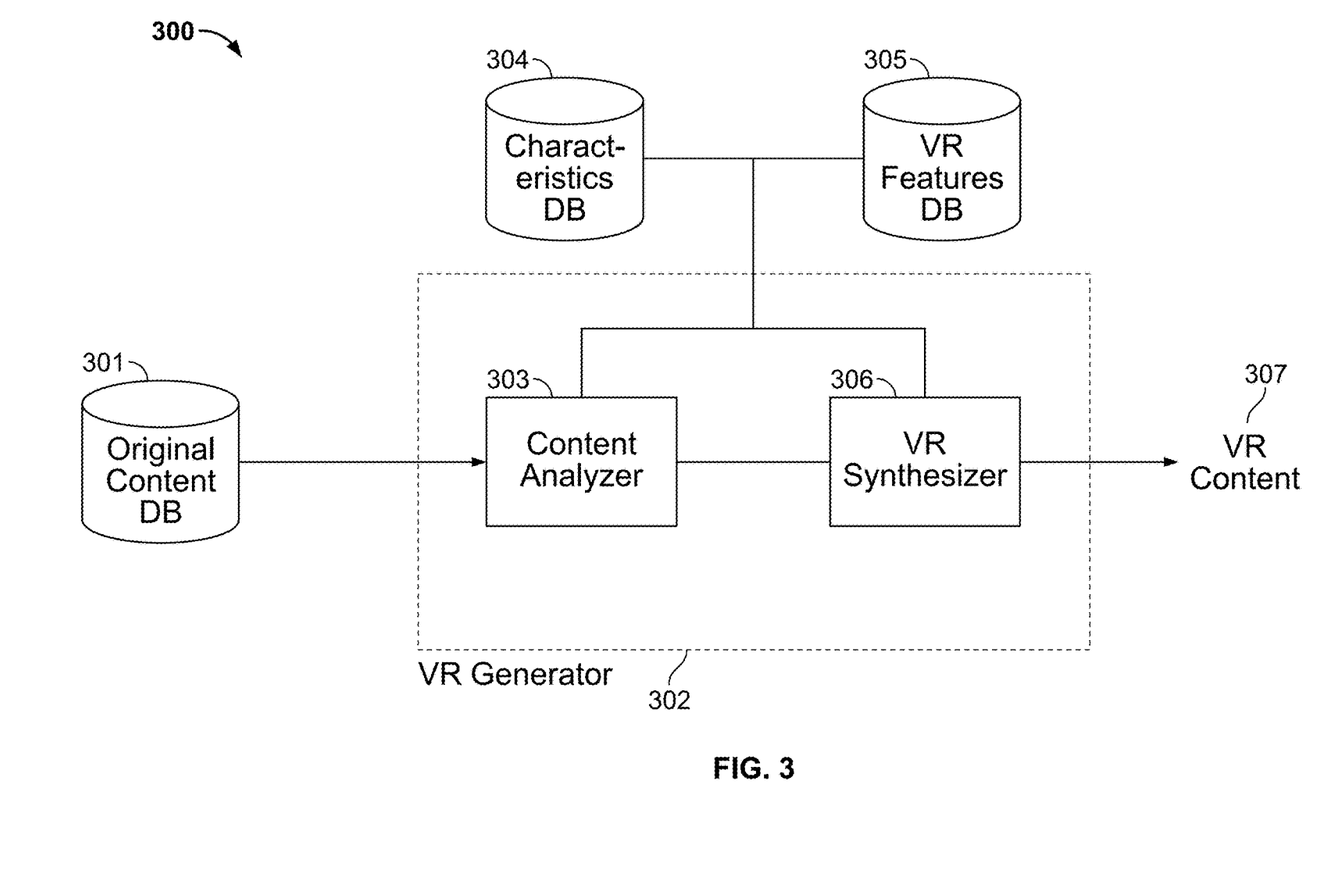
FIG. 3 is an illustration of an aspect of a system for generating modified VR content in accordance with an embodiment of the present disclosure.

Referring to FIG. 3, an embodiment of a VR content source 300 configured to dynamically generate VR content is depicted. In some embodiments, the VR content source 300 is configured to generate VR content based on original non-VR content, where particular features of the original content are identified and used to retrieve stored information to generate the VR content. In some embodiments, the original content is 2D or 3D content, and the VR content is generated based on the original content and additional stored information related to the original content. The additional stored information may be 2D content or 3D content related to the identified particular features of the original content and the stored information may be retrieved based on the identified particular features.

In some embodiments, the VR content source 300 includes a VR generator 302 for receiving original content from an original content database 301. For the purposes of this discussion, the term "original content" may refer to non-VR content such as traditional 2D content, and may also include 3D content which is not implemented as VR content. For example, the original content may include, without limitation, television broadcasts, sporting events, 2D movies, 2D multiview content, 3D movies, online video content, and the like. The embodiment of FIG. 3 depicts the source of the original content represented by a file based database system, however it will be understood by those of ordinary skill in the art that various other content sources may be implemented in the VR content source 300, including non-file based sources such as live television broadcasts, streaming internet content, fixed format content sources, and the like.

The original content may be stored or provided with associated metadata, including metadata adjustment values which correspond to the generated adjustment information provided by the adjustment calculator. Thus, using the generated adjustment information, the VR content source 300 may identify particular non-VR content (i.e., original content) associated with desired metadata adjustment values, and generate VR content from the non-VR content to be incorporated and used to modify the VR content being presented by the user to change the detected user condition. For example, where the generated adjustment information includes a metadata adjustment value of "relax: +3", the VR content source 300 may identify original content (non-VR) corresponding to a scene of a sunset with an associated matching metadata adjustment value of "relax: +3." The identified original content may then be used to generate VR content, according to the embodiments for VR content generation discussed below, for use in modifying the VR content being presented to the user.

The VR generator 302 may include a content analyzer 303 configured to process the original content received from the original content database 301. The content analyzer 303 may be configured to analyze various features of the original content, including object and scene recognition, face detection and recognition, audio and voice recognition, audio and voice detection, voice-to-text analysis, multi-channel audio analysis, graphic text analysis, and the like. The content analyzer 303 may perform the various analysis procedures, discussed in further detail below, and identify various features of the original content, including people, objects, environments, environment conditions, entire scenes, and the like.

Based on features of the original content identified by the content analyzer 303, additional information related to the identified features may be retrieved from a characteristics database 304. The characteristics database 304 may store various information related to identified people, objects, environments, environment conditions, and the like, and the characteristics database information may be stored to be associated with various metadata, wherein the metadata may correspond to audio, video, images, or text identified in the original content by the content analyzer 303. The stored information may include related video or images of the identified features which may be used to generate a 3D or VR content of the identified feature.

For example, the content analyzer 303 may detect a face of an actor depicted in the original content and perform facial recognition to identify a certain actor. The content analyzer 303 may query the characteristics database 304 with the name of the actor, or other metadata generated by based on the identified actor, to request additional stored information from the characteristics database. The query may include the actor's name, a unique identifier associated with the actor, or other metadata otherwise identifying the actor identified in the scene.

The content analyzer may retrieve additional stored content associated with the identified actor from the characteristics database 304, including video and images of the identified actor from various sides, angles, lighting, distances, and the like. The additional stored content may include any additional content which may contribute to the generation of VR content based on the original content, such as audio and video related to features of the original content. This includes additional content for the generation of VR content which is not included in the original content, such as information required to generate a complete 360 degree view to a viewer.

Figure 4:
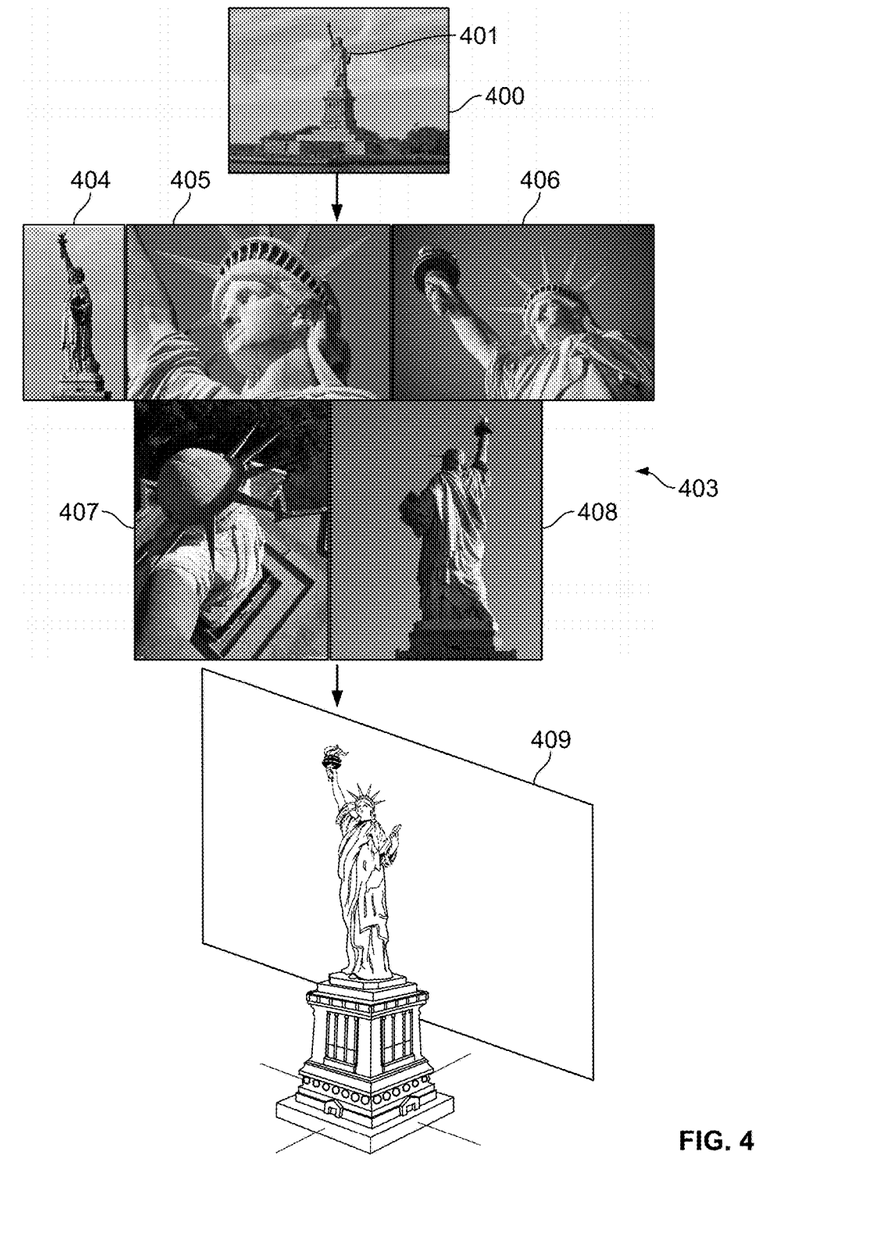
FIG. 4 is an illustration of an example of original source content, additional stored information related to the original content, and generated VR content in accordance with an embodiment of the present disclosure.

In an example shown in FIG. 4, the original content 400 may include a traditional 2D video clip which includes a scene depicting the Statue of Liberty 401. The content analyzer 103 may recognize and identify the landmark depicted in the scene as the Statue of Liberty and generate or obtain metadata associated with the scene of the original content 400. Based on the identified landmark 402 and the obtained metadata, the content analyzer 303 may query the characteristics database 304 to retrieve additional stored information 403 related to the Statue of Liberty to generate VR content.

The additional stored information may include images of the Statue of Liberty from various angles 404, 405, 406, 407, 408, and may also include a 3D video file (not shown) depicting the Statue of Liberty in three dimensions which was created for the generation of another unrelated media content, and stored and tagged with "Statue of Liberty" related metadata in the characteristics database 304. Based on the additional stored information 403 obtained from the characteristics database 304, VR content may be generated which includes a VR representation of the Statue of Liberty 409 based on the information provided by the various angle views and the 3D content of the landmark obtained from the characteristics database 304.

In yet another example, and referring back to FIG. 3, the content analyzer 303 may detect and recognize audio of a helicopter in the scene of the original content that is to be used for modifying the VR content being presented to the user, however the video of the scene may not include a depiction of the helicopter. In VR content requiring an environment which is viewable by the user in 360 degrees, the content analyzer 303 may identify the presence of a helicopter and query the characteristic database 304 for additional stored information related to helicopters based on the audio of the original content. The additional stored information may then be used, as described further below, to generate VR content in which a depiction of the helicopter is visible when a viewpoint of the user is changed to face the direction of the source of the helicopter audio.

In another embodiment, the characteristics database 304 may include audio information associated with stored metadata. In such embodiment, the content analyzer 303 may query the characteristics database 304 using the helicopter audio from the original content, by using an acoustic fingerprint or other representation of the audio. The characteristics database 304 may provide additional stored information associated with the audio if the query matches stored audio or stored acoustic fingerprints. For example, the additional stored information may include the model of the helicopter identifiable by a distinct rotor sound, and may further include images, 2D video, or 3D video of the particular model of the helicopter to be used for generating the VR content based on the original content. In other embodiments, the content analyzer 303 may be configured to analyze and recognize various features of the audio or video of the original content, such that the content analyzer 303 may perform recognition processes using other information sources prior to querying the characteristics database 304.

In one embodiment, the VR content source 300 may further include a VR features database 305 which stores previously created VR content. The previously created VR content may be associated with identifying metadata to enable the VR content source 300 to search for and retrieve the previously created VR content. In the previously discussed example involving the Statue of Liberty, the VR features database 305 may include VR content information depicting the Statute of Liberty which was created as VR content during the content creation process, including capturing all environments and objects from numerous viewpoints. Thus, the content analyzer 303 may query the VR features database 305, in addition to the characteristics database 304, to retrieve previously created VR content related to the Statue of Liberty, including individually captured video frame images, and the like.

In another example, the retrieved VR content information from the VR features database 305 may include VR content which was created by the VR content source 300 based on original non-VR content, which was stored in the VR features database 305 after being generated. Referring back to the example of FIG. 4, after the generated VR content 409 including the VR representation of the Statute of Liberty is generated, the VR content 409 may be stored in the VR features database 105. The VR content 409 may be stored to be associated with identifying metadata associated with the original content, the scene of the original content, as well as metadata associated with the landmark. Thus, the stored generated VR content 409 may be retrieved for use in later generation of VR content in connection with other and unrelated original content.

Figure 5:
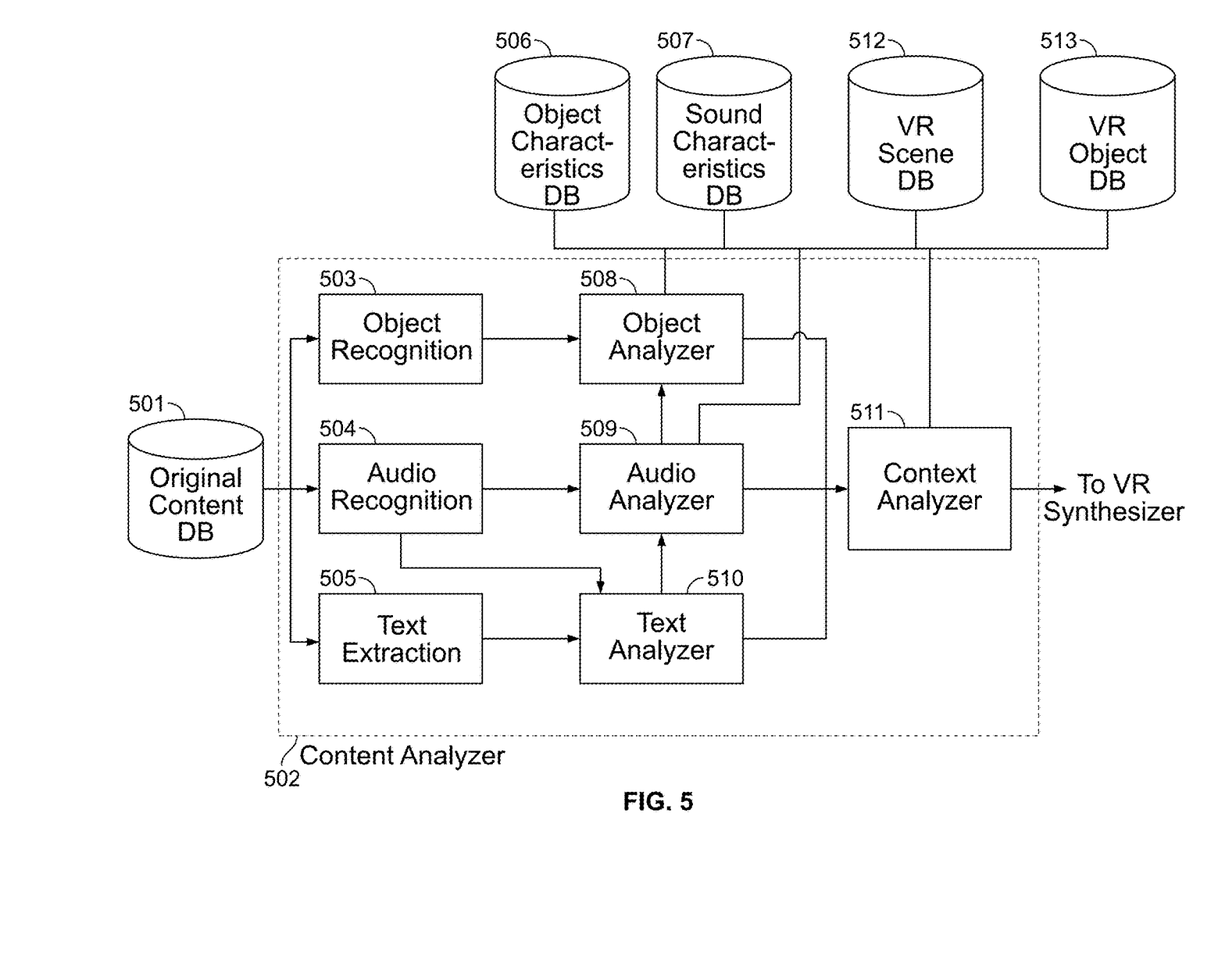
FIG. 5 is an illustration of another aspect of a system for generating modified VR content in accordance with an embodiment of the present disclosure.

In other embodiments, the system may include a VR objects database and a VR scene database (discussed further with reference to FIG. 5). In such embodiments, the VR objects database may be configured to store VR content information related to specific and identified objects which are extracted and may be incorporated into the generation of new VR content. Referring briefly to the example of FIG. 4, information of the VR representation of only the Statue of Liberty extracted from the generated VR content 409 may be stored in the VR objects database.

Additionally, the VR scene database may be configured to store VR content information related to complete scenes which may be used and incorporated into the generation of new VR content. The complete scenes may be stored to be associated with, and identified by, metadata adjustment values as previously discussed. Examples of this include VR scenes which may be implemented for content such as a VR scene of a beach, a VR scene of a waterfall, a VR scene of wildlife, and the like. Referring briefly to the example of FIG. 4, information of the entire VR scene corresponding to the generated VR content 409 may be stored in the VR scene database.

Further, the various information included in the characteristics database 304, the VR features database 305, the VR scene database, and VR object database may also be stored to be associated with metadata adjustment values as previously discussed, such as "fear: +5", "excitement: +4", "comfort: −3", and the like. Based on the generated adjustment information from the adjustment calculator, the VR content source 300 may select people, objects, environments, environment conditions, scenes, and the like from the databases based on their associated metadata adjustment values. Thus, in some embodiments the content analyzer 303 may query the characteristics database 304 with a required metadata adjustment value to request stored information from the characteristics database. The query may also include a category of content sought in relation to each metadata adjustment value (person, environment, object, and the like), or other metadata otherwise identifying a particular scene, object, person, or the like required to replace or modify the VR content based on the generated adjustment information. In this way, the original content may be identified based on metadata adjustment values, as well as the additional stored information related to the original content stored in the characteristics database 304, the VR features database 305, the VR scene database, and VR object database.

The VR generator 303 may further include a VR synthesizer 306 which receives the analyzed original content, additional information related to the original content retrieved from the characteristics database 304, and additional VR information retrieved from the VR features database 305. The VR synthesizer 306 may be configured to map the additional information to the original content in order to generate VR content 307 based on the original content.

In one example, the VR synthesizer 306 may be configured to generate a 3D surface map of a face or an object included in the original content, and utilize the additional information related to the face or the object retrieved from the characteristics database or the VR features database to generate a full 3D representation of the face or object for generation of the VR content. Other known 3D mapping techniques are considered for generating the VR content based on the original content and the additional stored information, and one of ordinary skill in the art will appreciate that various techniques and methods known and used in the related art may be applied in this aspect of the present disclosure.

The VR synthesizer may further incorporate audio information received from the content analyzer 303, including multi-channel audio to determine a position of an object or character within the generated VR space if the object or character is not depicted in the original content. The audio information may also be used to determine movement of an object or character within the VR space, for example where the VR content is generated to include a helicopter flying from left to right as determined from the directional audio information.

The generated VR content may be stored in the VR features database 305 for use in other VR content generation processes. In some embodiments, separate VR information may be stored in the VR objects database and the VR scene database for use in other VR content generation processes. The stored VR information may be associated with various metadata related to the content of the generated VR information including all objects, persons, landmarks, scenes, environment conditions, and the like, within the content, as well as the original content corresponding to the generated VR content. The stored VR information may further be stored to be associated with the metadata adjustment values as previously discussed. This metadata adjustment value information may be based on predetermined set values, or may be based on historical information gathered from feedback received after the generated VR content is presented to various users.

The VR content may also be generated to include all or some of the metadata identified, generated, or collected during the generation of the VR content. For example, if a particular actor is identified in the original content and the VR content includes a VR representation of the particular actor, the VR content may include metadata of the actor within the generated content information.

In yet other embodiments, various objects, persons, landmarks, and the like within the generated VR content may be actionable by viewer to activate and view the associated metadata. In such embodiments, a VR representation of the particular identified actor may be clickable or otherwise selectable within the VR space in order to view the metadata associated with the particular actor. The VR content may also be generated to include feedback instructions to be performed, such as by providing tactile or haptic feedback, and the like, in response to an action or interaction with a user. In other embodiments, the associated metadata may not be directly displayed to a user, but the metadata may be used to connect to external information sources, such as stored databases or the internet, to search for and retrieve information related to the particular actor based on the stored metadata in the generated VR content.

In some embodiments, the VR content source, the VR analyzer, and portions thereof may comprise one or more software or hardware computer systems. In an embodiment the VR content source and the VR analyzer may comprise or be operably coupled to one or more hardware memory systems for storing information including databases for storing, accessing, and querying various content and characteristics information. The one or more computer systems of the VR content source and VR analyzer may include one or more computer processors or controllers configured to process information, generate controlling commands, and the like. In one embodiment, the VR content analyzer and the VR synthesizer may each comprise a processor of the computer system, and in other embodiments a single processor may be configured to perform the associated functions. The various computer systems, memory, and components of the VR content source 300 may be operably coupled to communicate information, and the VR content source may further include various hardware and software communication modules and circuitry to enable wired or wireless communication of information.

Turning now to FIG. 5, an aspect of the content analyzer 502 of the VR content source 300 is shown. As previously discussed with respect to FIG. 3, the original content DB 501 or other content source may provide original content in the form of traditional 2D video, 2D multiview content, 3D video content, or the like, as discussed. The content analyzer 502 may include various components, including object recognition 503, audio recognition 504, and text extraction 505 components.

The object recognition component 503 may receive video or images of the original content and perform object detection and recognition processes in order to recognize various objects, landmarks, faces, and the like, depicted in the original content. The object recognition information is then passed to an object analyzer component 508 which generates a query based on the object recognition information to perform identification processes and retrieve additional related information stored in the object characteristics database 506, as previously discussed.

As an example, the object recognition component 503 may analyze the original content and detect a face in the original content. The object analyzer 508 may query the object characteristics database 506 with metadata of the detected face, wherein the query incorporates various metadata of the particular face. The object analyzer 508 may also be configured to query various other information sources to obtain identifying information of the particular face. In one example, the object analyzer 508 may query information provided by a third party, such as an image repository connected via a network such as the internet. In response to the query, the object analyzer 508 may receive identifying information of a particular actor corresponding to the recognized face of the original content. The object characteristics database 506 may also include stored information associated with metadata of the particular actor, including images or other video content depicting the actor's face from various angles.

In such an example, 2D video content stored in the object characteristics database 506 may be associated with metadata of the name of the actor and may include an actor turning his or her head to one side in a one-second 2D video clip. The video clip may have been created for use in separate unrelated media, or in other embodiments it may have been created specifically to populate the object characteristics database 506. Further in the example, if the one-second video clip is originally shot in 48 frames-per-second format, the stored information may provide up to 48 individual video frame images of the actor's head and face from varying angles, thereby providing additional three-dimensional information for mapping the actor's face and head in the generation of the VR content.

In an embodiment, the system also includes a VR scene database 512 and VR object database 513. The VR scene database 512 may be configured to store VR content information related to complete scenes which may be used and incorporated into the generation of new VR content. The VR objects database 513 may be configured to store VR content information related to specific and identified objects which are extracted and may be incorporated into the generation of new VR content. The information included in the VR scene database 512 and the VR object database 513 may be associated with corresponding metadata adjustment values as previously discussed. The object analyzer 508 may also query the VR scene database 512 and the VR object database 513 for existing VR content which corresponds to the identified objects, people, locations environments, and the like, of the original content, as well as associated metadata adjustment values. The query to the VR scene database 512 and the VR object database 513 may include the same or similar metadata information as the query to the object characteristics database 506 and the sound characteristics database 507 as previously discussed.

The audio recognition component 504 may receive audio of the original content and perform audio recognition processes in order to recognize various speech, voices, noises, and sounds included in the original content. The audio recognition information is then passed to an audio analyzer component 509 which generates a query based on the audio recognition information to retrieve additional related information stored in a sound characteristics database 507. In some embodiments, the audio recognition component 504 may be configured to extract specific audio characteristics and perform recognition using a database of previously collected and stored audio characteristics, or may be configured to query third party sources such as an audio clip repository connected via a network, such as the internet, as similarly discussed above with respect to the object recognition component 503. Using the recognition information, the audio analyzer 509 may query the sound characteristics database 507 to identify certain objects, features, conditions, people, and the like, included in the original content. In some embodiments, the audio analyzer 509 may also be configured to query the VR scene database 512 and the VR object database 513 for existing VR content related to the recognition information, similar to the query previously discussed with respect to queries generated by the object analyzer 508.

For example, as previously discussed, the distinctive acoustic fingerprint of a helicopter rotor sound may be used by the audio analyzer to match with an acoustic fingerprint or other identifying audio information of a helicopter stored in the sound characteristics database 507. In another example, a voice may be recognized by the audio recognition component 504, and the audio analyzer may query the sound characteristics database 507 to match the recognized voice with voice information stored in the database in order to identify the particular actor or person. Thus, the audio analyzer 509 may also provide the object analyzer 508 with additional information—by identifying audio of people, objects, and the like—to perform object analysis in order to generate an accurate metadata query for additional stored information from the object characteristics database 506.

In other embodiments, the audio recognition component 504 may provide context information for particular objects to be generated in the VR format. For example, the audio recognition component 504 may detect that the audio of the helicopter provided in multi-channel audio indicates that the helicopter is flying through a scene in a left to right direction. Based on this recognized information, the audio analyzer may generate context information for generating the VR scene to compile a virtual representation of its position, speed, and direction within the virtual space.

Additionally, information of the identified helicopter may be retrieved and included in the generated VR content even where the original content does not include a visual depiction of the helicopter. For example, in a scene of the original content, the rotor sound of a helicopter may be heard just off screen, but no depiction of the actual helicopter may be included. Based on the audio information as previously discussed, the helicopter, as well as its position with respect to the viewer of the original content may be identified. The information provided by the audio analyzer may be used by the object analyzer to retrieve images or video of the identified helicopter stored in the object characteristics database 506, VR scene database 512, or VR object database 513 to be mapped to the audio of the original content and used in generating 360 degree VR content which includes a view of the helicopter when the VR viewer is turned in the identified direction of the helicopter.

In some embodiments, the information obtained from the audio recognition component 504 may provide environmental information in addition to the context information for particular scenes to be generated in the VR format by providing a full 360 degree VR experience to a viewer. For example, the audio recognition component 504 may detect sounds recognized as crashing waves along a shore. Based on the recognized audio information, the audio analyzer 509 may provide information to the object analyzer 508 and the context analyzer 511 that the VR scene to be generated involves a coast or beach environment. The information from the audio recognition component 504 may be implemented to inform various other environmental conditions, such as flashes, rain, wind, traffic, indoors, outdoors, nighttime, daytime, morning, and the like. The context analyzer 511 may use the information related to a coast or beach environment to retrieve existing information stored in the object characteristics database 506, sound characteristics database 507, VR scene database 512, or VR object database 513 associated with a coast or beach environment to provide the VR synthesizer with environment information to generate the VR content.

Therefore, the context analyzer may retrieve additional stored content indicated by objects, environments, settings, and the like, as well as metadata adjustment values which are provided by audio, video, and text of the original content or the generated adjustment information in order to retrieve additional stored content to complete the 360 degree VR content, where the original content, such as traditional 2D original content for example, does not include such information, or the generated adjustment information calls for such content.

Referring back to the example of FIG. 4, the context analyzer 511 may obtain information of the Statue of Liberty 401 depicted in the original content 400. Based on this information, the context analyzer 511 may identify that the scene context is based in New York and may retrieve additional stored information associated with New York metadata, as well as specific image, sound, and object information stored in the object characteristics database 506, sound characteristics database 507, VR scene database 512, or VR object database 513 to retrieve the information needed to generate a full 360 degree view of the Statue of Liberty area indicated by the original content 400. The retrieved information may include environmental or object information of the Statue of Liberty area that was created and used for other media content, or that was created specifically to collect video and audio information for later use by the VR generator. Thus, the context analyzer 511 retrieves information not included in the original content 400 in order to identify sufficient information needed to generate VR content capable of providing a 360 degree view to a viewer based on the original content, although the original content may only include information for a single viewing angle in the environment.

Additionally, a text extraction component 505 may be included in the content analyzer 502 to extract text information from the original content. Extracted text from the original content may include subtitles, closed captioning content, actual text depicted within the original content, and the like. The extracted text may be provided to the text analyzer 510. Additionally, the text analyzer 510 may receive text information from the audio recognition component 504 resulting from speech-to-text recognition performed by the audio recognition component. The text analyzer 510 may process the extracted text information to provide additional object, context, or environmental information similar to that as previously discussed with respect to the audio analyzer 509.

For example, if extracted text information indicates that a particular scene of the original content occurs in a restaurant (i.e., speech-to-text information is received of characters ordering from a menu), the text analyzer 510 may provide environment context information to the context analyzer 511 to inform that the VR scene is to be generated within a restaurant setting. In some embodiments, the text analyzer may also provide the environment context information to the audio analyzer 509 and the object analyzer 508. This environment context information may contribute to improving efficiency when generating informed queries to the object characteristics database 506 and the sound characteristics database 507.

Additionally, the context analyzer 511 may receive the information generated and retrieved by the object analyzer 508, audio analyzer 509, and the text analyzer 510 to generate additional features of the generated VR content based on the environment and context of the original source content. For example, the context analyzer 511 may determine that a particular scene occurs in a beach setting, and may query the object characteristics database 506, sound characteristics database 507, VR scene database 512, and VR object database 513 to retrieve additional information to generate a complete scene in the generated VR content.

Thus, in addition to images and video to generate the visual aspects of the VR content, the context analyzer may also retrieve audio information such as ambient sounds such as background seagull sounds, a sound of crashing waves along a shore, a background sound of a bell being rung from a nearby boat, and the like. The context images, video, audio, and other information may thus be retrieved and output by the context analyzer 511 for generation of the VR content.

The context analyzer may also be utilized to modify the context of the VR content according to the generated adjustment information. For example, where the original content includes a setting in a dark environment and the adjustment information includes a metadata adjustment of "brightness: +5", the context analyzer may determine that the VR scene is to be generated in a brighter environment instead.

Various embodiments of the VR content source may further comprise additional aspects which have been omitted for the purposes of the discussion of FIG. 5, and it will be understood by those of ordinary skill in the art that all combinations of aspects of the system are considered including a VR features database, VR synthesizer, and the like, as discussed with respect to the examples of FIG. 3. Additionally, it will be understood that this disclosure considers embodiments of a system for generating VR content wherein the system includes all of the components depicted and discussed herein, including a system having hardware or software components implemented together, or separated and connected by known networking and communication methods and techniques.

As previously discussed, in some embodiments the content analyzer 502 may comprise one or more software or hardware computer systems and may further comprise or be operably coupled to one or more hardware memory systems for storing information including databases for storing, accessing, and querying various content and characteristics information. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the object analyzer 508, audio analyzer 509, and text analyzer 510 may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 200 may be operably coupled to communicate information, and the system may further include various hardware and software communication modules, interfaces, and circuitry to enable wired or wireless communication of information.

Figure 6:
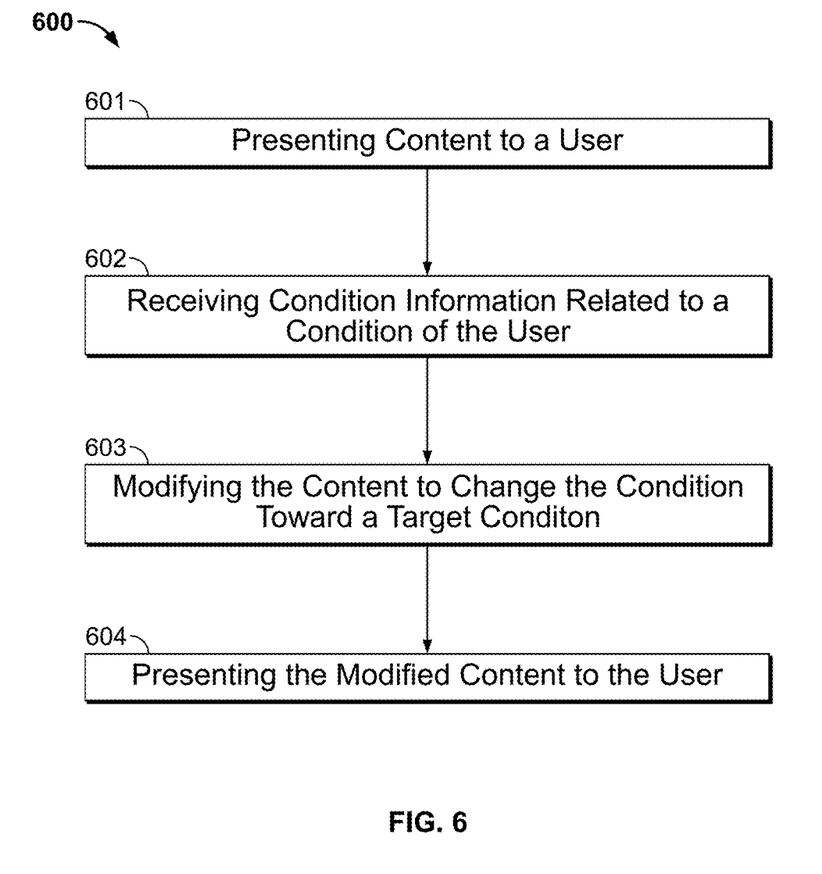
FIG. 6 is an illustration of a method for customizing VR content in accordance with an embodiment of the present disclosure.

Turning now to FIG. 6, the figure shows a flowchart including operations of a method 600 of an embodiment of the present disclosure for customizing VR content. The method 600 includes an operation block at 601 of presenting VR content to a user and receiving condition information related to a condition of the user while the content is being presented to the user at block 602. The condition information may include gesture, expression, or biometric information related to the user while the user experiences the VR content being presented. The embodiment further includes modifying the content being presented to the user to change the condition toward a target condition at block 603. This operation may include processing the user condition information and generating corresponding metadata to represent the user condition information. The information of the generated metadata representing the user condition information may be compared to the target condition stored as values associated with metadata factors. The method 600 may further include presenting the modified VR content to the user at block 604.

According to embodiments of the present invention, a system for customizing VR content may include one or more computer systems, computer processors, storage devices, distribution channels, etc., in order to obtain user condition information, determine metadata adjustment information to achieve a desired user condition, and modify the VR content or generate VR content based on the adjustment information. Portions of the VR content, modified VR content, user condition information, desired condition information, metadata adjustment values, and non-VR content for generating VR content may reside in different locations, or may be distributed widely and coordinated with one another across communication networks, particularly in a large organization. Moreover, particular portions may reside in entirely separate environments, such as content creators, content distributors, and the like.

Various embodiments described herein may be implemented in a computer-readable non-transitory medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor. In all embodiments, the various components described herein may be implemented as a single component, or alternatively may be implemented in various separate components.

The various devices, modules, terminals, and the like discussed herein may be implemented on a computer by execution of software comprising machine instructions read from computer-readable medium. These hardware aspects may further include an input/output interface, graphical user interface, or other input/output means to allow the input/output of information related to controlling functions, inputting information, outputting information, receiving information, or transmitting information. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for customizing content presented to a user, the method comprising:
   presenting content to the user, the content comprising predetermined first content at a first time point and predetermined second content at a second time point;
   receiving current condition information related to a condition of the user while the predetermined first content is being presented to the user at the first time point of the content;
   prior to the second time point, predicting a condition of the user where such condition is predicted in response to being presented with the predetermined second content at the second time point of the content;
   identifying a desired target condition of the user to be reached by the upcoming second time point of the content;
   modifying the predetermined second content that will appear at the upcoming second time point if the predicted condition is not within a threshold range of the desired target condition, wherein the predetermined second content is modified to facilitate changing of the condition of the user from the current condition to the desired target condition; and
   presenting the modified content to the user,
   wherein:
   the upcoming second time point is associated with a type of content being presented;
   a change in the condition of the user from the current condition information to the target condition in response to the type of content is predicted based on historical user condition data; and
   the historical user condition data comprises data of a historical condition change of the user in response to being presented with the type of content.

2. The method of claim 1, further comprising:
   receiving updated condition information of an updated condition of the user after presenting the modified content to the user, where the updated condition is not within a threshold range of the desired target condition; and
   modifying the content again at a third time point after the second time point to facilitate changing of the updated condition to be within the threshold range of the desired target condition.

3. The method of claim 1, wherein the condition information is received from a terminal configured to obtain the condition information of the user.

4. The method of claim 1, wherein the condition information includes biometric information of the user, including at least: a heart rate, body temperature, skin temperature, blood pressure, breathing rate, facial expression, or electroencephalogram (EEG) information.

5. The method of claim 1, wherein the desired target condition comprises a desired target range of values related to biometric information of the user.

6. The method of claim 5, further comprising identifying at least a portion of the content associated with a metadata factor related to a measurement of the condition information.

7. The method of claim 6, wherein modifying the predetermined second content comprises:
   generating metadata adjustment information comprising a change indicator value corresponding to the metadata factor related to the condition information; and
   modifying the identified at least a portion of the content to generate the modified content based on the generated metadata adjustment information.

8. The method of claim 7, further comprising:
   obtaining related content associated with the generated metadata adjustment information; and
   modifying the identified at least a portion of the content by incorporating information from the related content.

9. The method of claim 8, wherein the related content comprises virtual reality (VR) content and obtaining the related content comprises:
   obtaining source information from non-VR source content;
   retrieving characteristic information stored in a first memory based on the obtained source information, the retrieved characteristic information related to the non-VR source content; and
   generating the VR content based on the obtained source information and the retrieved characteristic information.

10. The method of claim 9, further comprising identifying an object in the non-VR source content based on the obtained source information;
    wherein the retrieved characteristic information comprises additional information of the identified object.

11. The method of claim 1, further comprising:
    receiving updated condition information related to the condition of the user after presenting the modified content to the user; and
    modifying the content again to facilitate changing of the condition of the user toward a previous user condition.

12. The method of claim 1, further comprising determining a particular modification of the predetermined second content to change the condition of the user to the desired target condition based on the historical condition change of the user in response to being presented with the type of content.

13. A system for customizing content presented to a user, the system comprising:
- a memory configured to store information;
- a receiver; and
- one or more controllers configured to:
  - cause content to be presented to the user, the content comprising predetermined first content at a first time point and predetermined second content at a second time point;
  - receive, via the receiver, current condition information related to a condition of the user while the predetermined first content is being presented to the user at the first time point of the content;
  - prior to the second time point, predict a condition of the user where such condition is predicted in response to being presented with the predetermined second content at the second time point of the content;
  - identify a desired target condition of the user to be reached by the upcoming second time point of the content;
  - modify the predetermined second content that will appear at the upcoming second time point if the predicted condition is not within a threshold range of the desired target condition, wherein the predetermined second content is modified to facilitate changing of the condition of the user from the current condition to the desired target condition; and
  - cause the modified content to be presented to the user, wherein:
- the upcoming second time point is associated with a type of content being presented;
- a change in the condition of the user from the current condition information to the target condition in response to the type of content is predicted based on historical user condition data; and
- the historical user condition data comprises data of a historical condition change of the user in response to being presented with the type of content.

14. The system of claim 13, wherein the one or more controllers are further configured to:
- receive, via the receiver, updated condition information of an updated condition of the user after presenting the modified content to the user, where the updated condition is not within a threshold range of the desired target condition; and
- modifying the content again at a third time point after the second time point to facilitate changing of the updated condition to be within the threshold range of the desired target condition.

15. The system of claim 13, wherein the condition information is received from a terminal configured to obtain the condition information of the user.

16. The system of claim 15, wherein the condition information includes biometric information of the user, including at least: a heart rate; body temperature; skin temperature; blood pressure; breathing rate; facial expression; or electroencephalogram (EEG) information.

17. The system of claim 13, wherein the desired target condition comprises a desired target range of values related to biometric information of the user.

18. The system of claim 17, wherein the one or more controllers are further configured to identify at least a portion of the content associated with a metadata factor related to a measurement of the condition information.

19. The system of claim 18, wherein the one or more controllers are further configured to:
- generate metadata adjustment information comprising a change indicator value corresponding to the metadata factor related to the condition information; and
- modify the identified at least a portion of the content to generate the modified content based on the generated metadata adjustment information.

20. The system of claim 19, wherein the one or more controllers are further configured to:
- obtain related content associated with the generated metadata adjustment information; and
- modifying the identified at least a portion of the content by incorporating information from the related content.

21. The system of claim 20, wherein:
- the related content comprises virtual reality (VR) content; and
- to obtain the related content, the one or more controllers are further configured to:
  - obtain source information from non-VR source content;
  - retrieving characteristic information stored in a first memory based on the obtained source information, the retrieved characteristic information related to the non-VR source content; and
  - generate the VR content based on the obtained source information and the retrieved characteristic information.

22. The system of claim 21, wherein the one or more controllers are further configured to identify an object in the non-VR source content based on the obtained source information;
wherein the retrieved characteristic information comprises additional information of the identified object.

23. The system of claim 13, wherein the one or more controllers are further configured to:
- receive, via the transceiver, updated condition information related to the condition of the user after presenting the modified content to the user; and
- modify the content again to facilitate changing of the condition of the user toward a previous user condition.

24. The system of claim 13, wherein the one or more controllers are further configured to determine a particular modification of the predetermined second content to change the condition of the user to the desired target condition based on the historical condition change of the user in response to being presented with the type of content.

* * * * *